US009411652B2

(12) United States Patent
Hechtman et al.

(10) Patent No.: US 9,411,652 B2
(45) Date of Patent: Aug. 9, 2016

(54) RUNTIME FOR AUTOMATICALLY LOAD-BALANCING AND SYNCHRONIZING HETEROGENEOUS COMPUTER SYSTEMS WITH SCOPED SYNCHRONIZATION

(71) Applicant: Advanced Micro Devices, Inc., Sunnyvale, CA (US)

(72) Inventors: Blake A. Hechtman, Bellevue, WA (US); Derek R. Hower, Seattle, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 14/466,594

(22) Filed: Aug. 22, 2014

(65) Prior Publication Data
US 2016/0055033 A1    Feb. 25, 2016

(51) Int. Cl.
*G06F 9/46* (2006.01)
*G06F 9/44* (2006.01)
*G06F 9/45* (2006.01)
*G06F 9/50* (2006.01)
*G06F 9/52* (2006.01)

(52) U.S. Cl.
CPC ............... *G06F 9/505* (2013.01); *G06F 9/468* (2013.01); *G06F 9/52* (2013.01)

(58) Field of Classification Search
CPC ............ G06F 9/468; G06F 9/505; G06F 9/52
USPC .................................... 717/149–164; 718/105
See application file for complete search history.

(56) References Cited

U.S. PATENT DOCUMENTS

| | | | | |
|---|---|---|---|---|
| 7,321,958 B2 * | 1/2008 | Hofstee | ............... | G06F 12/0284 711/148 |
| 7,689,783 B2 * | 3/2010 | Hofstee | ............... | G06F 12/0284 711/148 |
| 8,108,633 B2 * | 1/2012 | Munshi | ................. | G06F 9/5016 709/226 |
| 8,156,285 B2 * | 4/2012 | Hady | .................... | G06F 15/167 711/130 |
| 8,276,164 B2 * | 9/2012 | Munshi | ................. | G06F 9/4843 718/102 |
| 8,957,906 B2 * | 2/2015 | Munshi | ................. | G06F 9/5044 345/502 |

OTHER PUBLICATIONS

Aleksander Gjermundsen, "CPU and GPU Co-processing for Sound", 2010, Master thesis, Norwegian University of Science and Technology, Norway, 173 pages.*
George Kyriazis, "Heterogeneous System Architecture: A Technical Review", 2012, retrieved from http://developer.amd.com/wordpress/media/2012/10/hsa10.pdf, 18 pages.*

(Continued)

*Primary Examiner* — Ted T Vo
(74) *Attorney, Agent, or Firm* — Volpe and Koenig, P.C.

(57) ABSTRACT

Sharing tasks among compute units in a processor can increase the efficiency of the processor. When a compute unit does not have a task in its task memory to perform, donating tasks from other compute units can prevent the compute unit from being idle while there is task in other parts of the processor. It is desirable to share tasks among compute units that are within defined scopes of the processor. Compute units may share tasks by allowing other compute units to access their private memory, or by donating tasks to a shared memory.

18 Claims, 8 Drawing Sheets

(56) References Cited

OTHER PUBLICATIONS

Michael Backer, "Accelerators: GPU vs. Intel MIC Architecture, Programming Models and Exemplary comparison for the Radix Sort Algorithm", 2013, In Proceedings of the Seminar Advanced Computer Architecture, WS 2012/13, University of Paderborn, pp. 1-20.*

Blumofe et al., "Cilk: An Efficient Multithreaded Runtime System" Symposium on Principles and Practice of Parallel Programming (PPoPP '95), Santa Barber, California Jul. 19-21, 1995 (11 pages).

Frigo et al., "The Implementation of the Cilk-5 Multithreaded Language" Programming Language Design and Implementation (PLDI), Montreal, Canada Jun. 1998 (12 pages).

* cited by examiner

RUNTIME FOR AUTOMATICALLY LOAD-BALANCING AND SYNCHRONIZING HETEROGENEOUS COMPUTER SYSTEMS WITH SCOPED SYNCHRONIZATION

CROSS REFERENCE TO RELATED APPLICATIONS

This application is related to U.S. Provisional Patent Application No. 61/822,753, which is hereby incorporated by reference in its entirety.

BACKGROUND

1. Field

The embodiments are generally directed to load-balancing among computer components.

2. Background Art

A computing device, such as a graphics processing unit (GPU), may include multiple processors or compute units. Each compute unit has a number of tasks in a local memory. A mechanism for sharing tasks among the processors may increase the efficiency of the computing device. For example a compute unit that has no tasks in its memory may get tasks from another computing device with tasks in its memory. Such approach reduces idleness of compute units, therefore increases efficiency. It is desirable to share tasks among compute units based on a relationship among compute units.

SUMMARY

According to an embodiment, a method includes determining first and second sets of compute units of a processor. The method further includes sharing a first set of tasks among the compute units within the first set of compute units and sharing a second set of tasks among the compute units within the second set of compute units.

According to an embodiment, the sharing includes allowing a first compute unit in the first set of compute units to access the first set of tasks from a memory of a second compute unit in the first set of compute units. The method also includes allowing a first compute unit in the second set of compute units to access the second set of tasks from a memory of a second compute unit in the second set of compute units.

According to an embodiment, the sharing also includes donating the first set of tasks from a private memory of a first compute unit in the first set of compute units to a shared memory of the first set of compute units. The method also includes donating the second set of tasks from a private memory of a first compute unit in the second set of compute units to a shared memory of the second set of compute units.

According to an embodiment, a method includes determining first and second level-one sets of compute units, each comprising at least one compute unit of a processor. The method further includes determining a level-two set of compute units that comprises a first compute unit of the first level-one set of compute units and a first compute unit of the second level-one set of compute units. The method further includes retrieving a first task from a level-one shared set of tasks when a private memory of the first compute unit is empty. The level-one shared set of tasks may be accessible by all compute units of the first level-one set of compute units. The method further includes retrieving a second task, from a level-two shared set of tasks when the private memory of the first compute unit and the level-one shared set of tasks are empty. The level-two shared set of tasks may be accessible by all compute units of the level-two set of compute units.

Further features and advantages of the present disclosure, as well as the structure and operation of various embodiments of the present disclosure, are described in detail below with reference to the accompanying drawings. It is noted that the present disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURE

The accompanying drawings, which are incorporated herein and form part of the specification, illustrate the embodiments and, together with the description, further serve to explain the principles of the embodiments and to enable a person skilled in the pertinent art to make and use the embodiments. Various embodiments are described below with reference to the drawings, wherein like reference numerals are used to refer to like elements throughout.

The embodiments will be described with reference to the accompanying drawings. Generally, the drawing in which an element first appears is typically indicated by the leftmost digit(s) in the corresponding reference number.

DETAILED DESCRIPTION OF EMBODIMENTS

Figure 1:
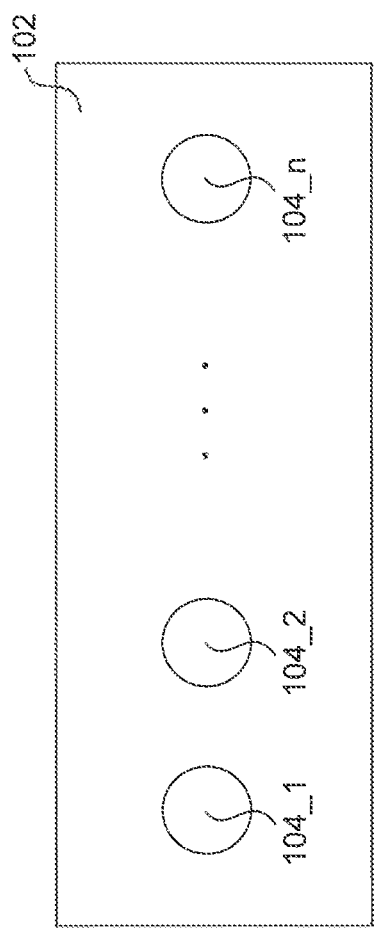
FIG. 1 illustrates a processor including compute units, according to an embodiment.

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements of the disclosure may not be described in detail or may be omitted so as not to obscure the relevant details. In addition, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Computing devices process data and provide many applications to users. Example computing devices include, but are not limited to, mobile phones, personal computers, workstations, and game consoles. Computing devices use a central processing unit ("CPU") to process data. A CPU carries out instructions of computer programs or applications. For example, a CPU carries out instructions by performing arithmetical, logical and input/output operations. In an embodiment, a CPU performs control instructions that include decision making code of a computer program or an application, and delegates processing to other processors in the electronic device, such as a graphics processing unit ("GPU").

A GPU is a processor that is specialized electronic circuit designed to rapidly process mathematically intensive applications on electronic devices. GPU has a highly parallel structure that is efficient for parallel processing of large blocks of data, such as mathematically intensive data common to computer graphics applications, images and videos. The GPU may receive data for processing from a CPU or generate data for processing from previously processed data and operations. In an embodiment, the GPU is a hardware-based processor that uses hardware to process data in parallel.

Due to advances in technology, a GPU also performs general purpose computing (also referred to as GPGPU computing). In GPGPU computing, a GPU performs computations that traditionally were handled by a CPU. An accelerated processing unit (APU) includes at least the functions of a CPU and a GPU. A GPU can be a GPGPU.

In an embodiment, a GPU or a GPGPU may include one or more compute units (CUs) that process data. A compute unit (CU) may include arithmetic logic units (ALUs) and other resources that process data on the GPU. Data may be processed in parallel within and across compute units. Embodiments described herein can be used in any processor, such as GPU or GPGPU with multiple CUs.

In an embodiment, a control processor on a GPU schedules task processing on compute units. Tasks include computation instructions. Those computation instructions may access data stored in the memory system, or task memory of a computing device and manipulate the accessed data. In an embodiment, a task memory may be, for example, a task queue. In an embodiment, the data may be stored in volatile or non-volatile memory. An example of volatile memory includes random access memory (RAM). Examples of RAM include dynamic random access memory (DRAM) and static random access memory (SRAM). Volatile memory typically stores data as long as the electronic device receives power. Examples of non-volatile memory include read-only memory (ROM), flash memory, ferroelectric RAM (F-RAM), hard disks, floppy disks, magnetic tape, optical discs, etc. Non-volatile memory retains its memory state when the electronic device loses power or is turned off.

A processor may include one or more scopes. In an embodiment, a scope includes a set of CUs in the processor. The set may also includes tasks memories corresponding to each CU.

Determining the sets in the processor impacts creating the processor scopes. Determining the sets may depend on the architecture of the processor. Architecture of the processor may include architecture of the CUs of the processor. For example, a set may include CUs that are in certain proximities of each other. Alternatively determining the sets may depend on connectivity or communication properties among the CUs, such as bus speed. Determining of the sets may also depend on resources available to the processing elements in the processor, such as memory resource. For example sets may be determined such that CUs that have access to the same memory bank may be part of the same set.

Embodiments include synchronizing among CUs within a scope, or scoped synchronization. Scoped synchronization may increase the efficiency of the computing device. Synchronizing may include synchronizing tasks among CUs. In embodiments, synchronizing includes sharing tasks among CUs.

Embodiments may include a hierarchy of scopes or sets of CUs in the processor. For example, a processor may include a global set that includes the entire processor and lower level sets that include a subset of the global set.

Compute Unit Sets in a Processor According to an Embodiment

FIG. 1 illustrates a processor 102 that includes CUs 104_1, 104_2, . . . , 104_n, according to an embodiment. Each CU may process tasks from a task memory, for example a cache or a queue. In an embodiment each CU has a private task memory that stores the tasks for the CU. In another embodiment, a set of compute units also has a shared memory that stores shared tasks for any compute unit in the set.

Figure 2:
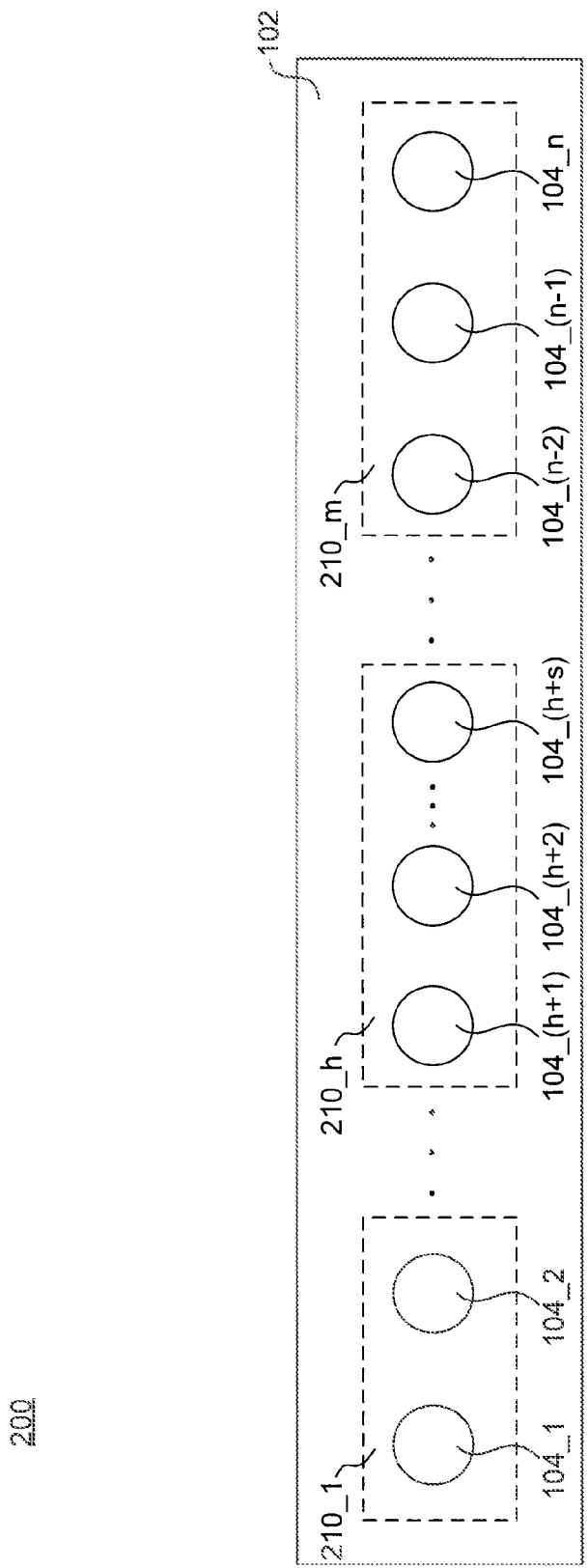
FIG. 2 illustrates a computing device including sets of compute units, according to an embodiment.

FIG. 2 illustrates a processor 102 that includes compute unit sets 210_1, . . . , 210_m, according to an embodiment. Compute unit set 210_1 may for example include compute units 104_1 and 104_2, and compute unit set 210_m may for example include compute units 104_(n−2), 104_(n−1), and 104_n, according to an embodiment. Each compute unit may have its own private task memory. In an embodiment, a private memory, of a specific compute unit, stores tasks accessible to only the specific compute unit. In another embodiment, a specific compute unit may allow other compute units to access at least one of the tasks in the private memory of the specific compute unit. Each set of compute units may also have a shared task memory accessible by any compute unit in the set.

In an embodiment, compute units that have tasks in their private memory may share some of the tasks with other compute units. This may allow a compute unit that does not have any task in its private memory to process a task from the shared task memory, instead of being idle. This may result in increase in the efficiency of the processor.

In an embodiment, compute unit sets are mutually exclusive. For example, compute unit sets 210_1 . . . 210_m have no compute unit in common.

Scoped Task Sharing in Processor According to an Embodiment

Figure 3:
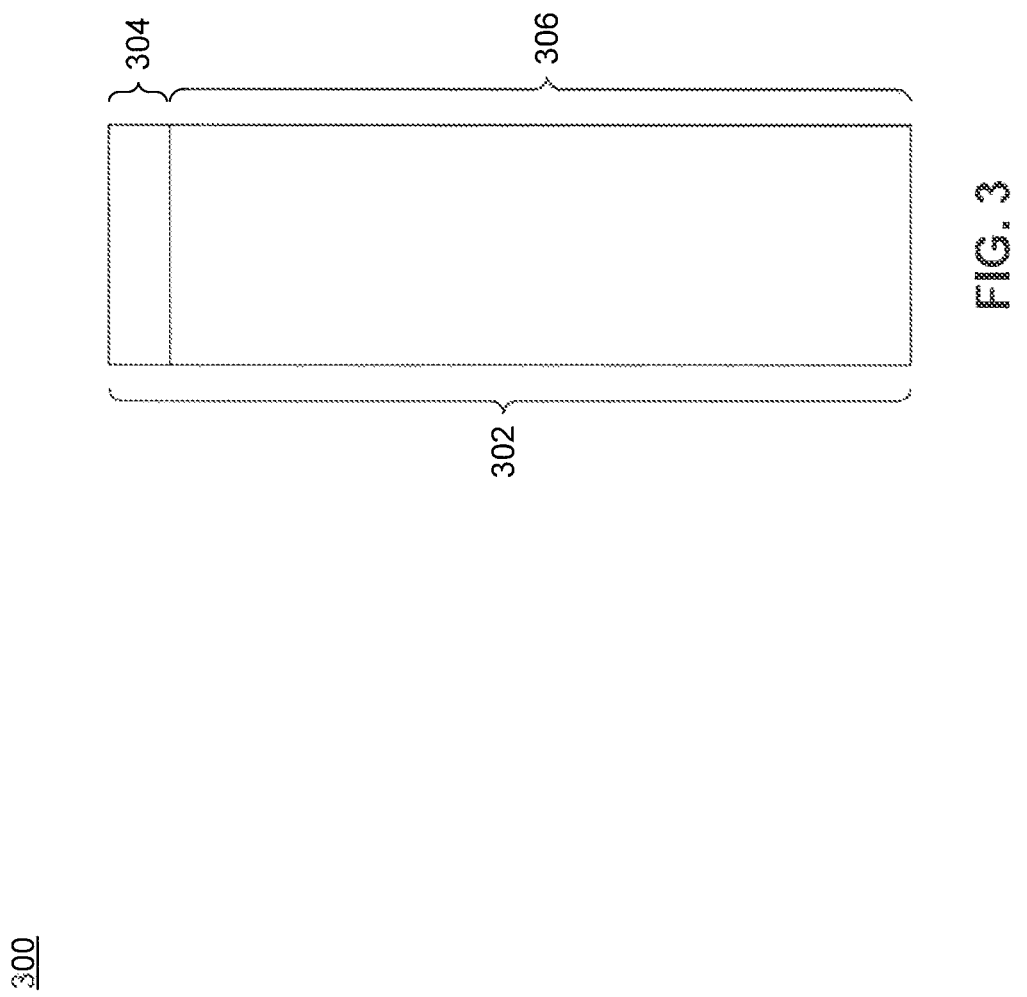
FIG. 3 illustrates a task memory of a compute unit, according to an embodiment.

FIG. 3 illustrates a local task memory 300 of a compute unit, according to an embodiment. For example, local task memory 300 corresponds to compute unit 104_1 in FIG. 1. Portion 302, as shown in FIG. 3, is the entire portion of local memory 300. In one example, portion 302 may include a shared portion 304 and a private portion 306. According to an embodiment, in order for the compute unit 104_1 to share tasks with another compute unit, the compute unit 104_1 may allow the other compute units to access tasks in shared portion 304 of its local memory 300. In other words, shared portion 304 of the entire portion 302 will become a shared memory among computing units in a set of computing units, according to embodiment.

In an embodiment, only compute units in the same set as a compute unit have access to a shared portion of the local memory of the compute unit. For example, referring to the embodiment shown in FIG. 2, shared portion 304 of local memory 300 of compute unit 104_1 can be accessed only by compute units in set 210_1, namely 104_1 and 104_2. Private portion 306 is accessible only by the compute unit 104_1 in the example embodiment.

In another embodiment, any other compute unit may access shared portion 304 of local memory 300. For example, referring to the embodiment shown in FIG. 2, shared portion 304 of private memory of compute unit 104_1 can be accessed by any compute unit in processor 102 (FIG. 2).

Accessing a shared memory portion may be achieved by any shared memory access method, such as memory fencing. Also one may use memory access methods described in U.S. Provisional Patent Application No. 61/822,753, the entirety of which is hereby incorporated by reference.

Scoped Task Sharing in Processor According to an Embodiment

Figure 4:
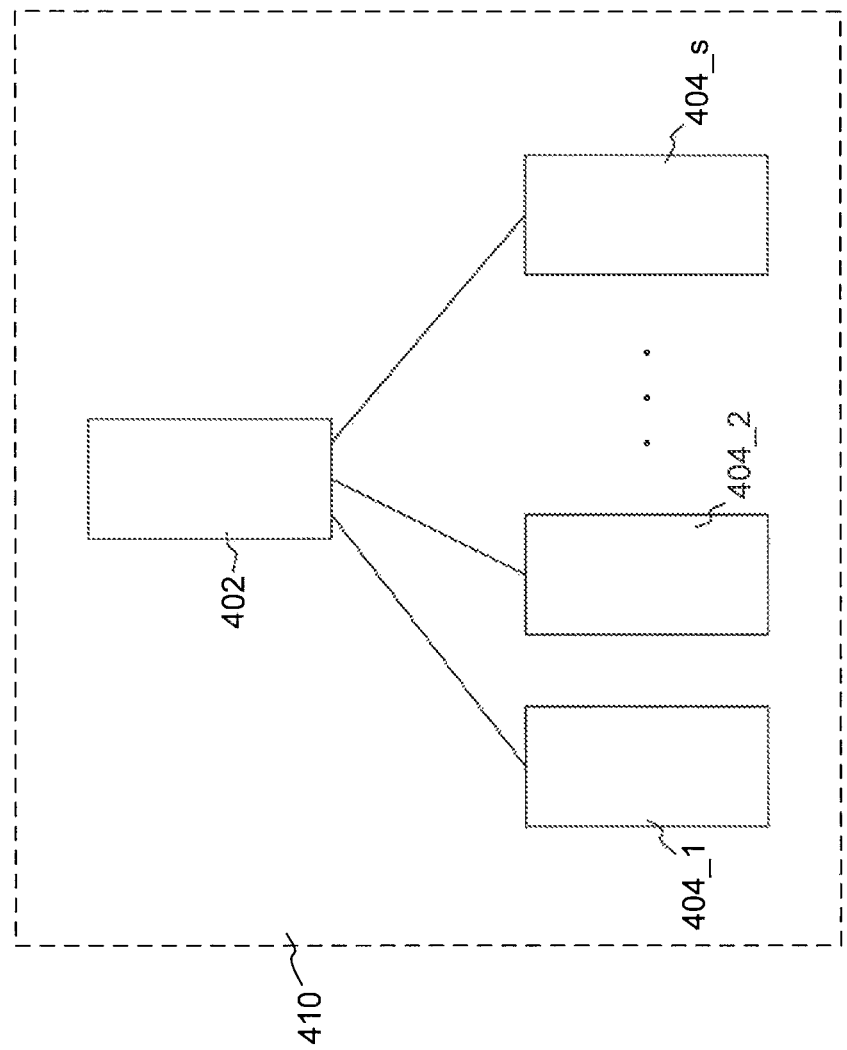
FIG. 4 illustrates task memories in a set of compute units, according to an embodiment.

FIG. 4 illustrates memories 410 in a set of compute units, according to an embodiment. Memory 402 is a shared memory among compute units in the set. Memories 404_1, 404_2, . . . , 404_s are local memories and each correspond to a compute unit, according to an embodiment. Using the example of FIG. 2 for illustrative purposes, memories 410 may correspond to set 210_h of compute units. Local memories 404_1, 404_2, . . . , 404_s may for example correspond to compute units 104_(h+1), 104_(h+2), 104_(h+s) respectively. Shared memory 402 may be accessible by all the compute units in set 210_h, according to the embodiment.

According to an embodiment, each compute unit set has a shared task memory. Each compute unit in a set of compute units donates tasks from its private task memory to the set's shared task memory. Such donations allow task sharing among the compute units in the set, according to the embodiment.

In an embodiment, each time a new task is assigned to a compute unit, if the number of tasks in the shared memory of the set is below a threshold, the new task is donated to the shared memory of the set. This may allow a compute unit that has an empty local task memory, to retrieve and process a task from the shared memory instead of being idle. This may improve the efficiency of the computing device.

Compute Unit Sets in a Processor According to an Embodiment

Figure 5:
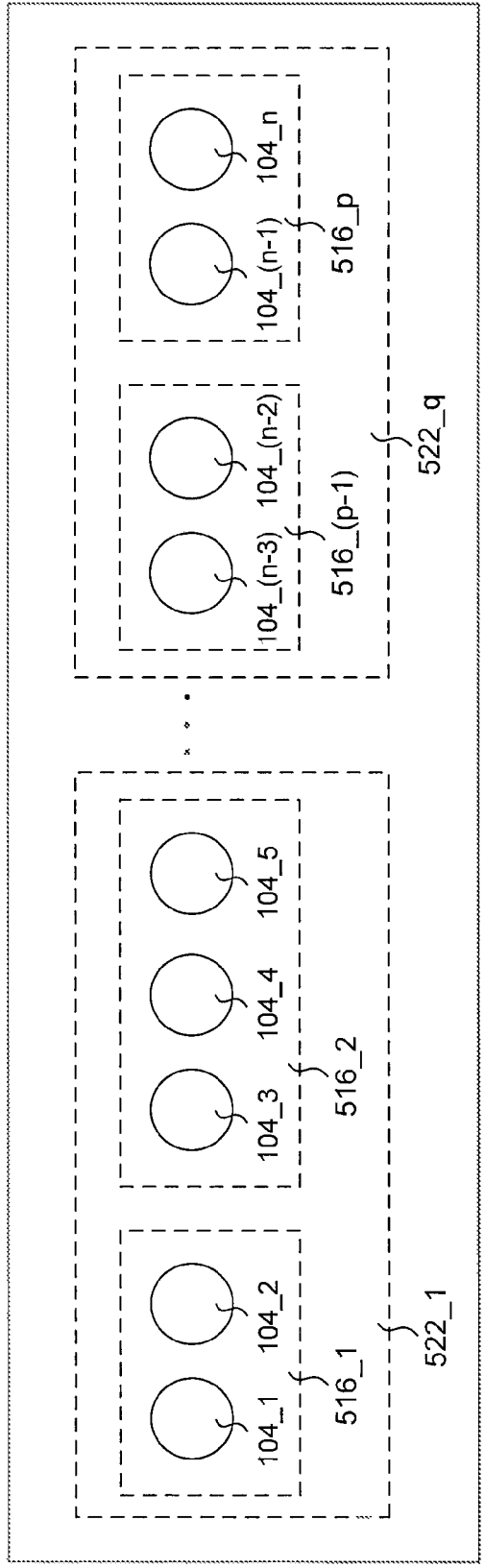
FIG. 5 illustrates a computing device including sets of compute units, according to an embodiment.

FIG. 5 illustrates a computing device 500 including a two level hierarchy of computing unit sets, according to an embodiment. In the example embodiment, computing device 500 includes computing units 104_1, . . . , 104_n formed into level-one sets of compute units 516_1, . . . , 516_p. In this example, level-one sets are farther formed into level-two sets of 522_1, . . . , 522_q.

The two levels of hierarchy illustrated in FIG. 5 is for illustration purposes. It is obvious to ordinary artisan in the art that the hierarchy of sets of compute units can have any number of levels.

Forming the compute units into sets can enable sharing tasks among the compute units at different levels. For example, compute units in a level-one set can share tasks among each other. At the second level, compute units in all the sets that form a level-two set can share tasks among each other, in an embodiment.

In an embodiment, compute unit sets, at each level, are mutually exclusive. For example, compute unit sets 516_1 . . . 516_p have no compute unit in common, in the embodiment. In an example, compute unit sets 522_1 . . . 522_q have no compute unit in common, in the embodiment.

Scoped Task Sharing in Processor According to an Embodiment

Figure 6:
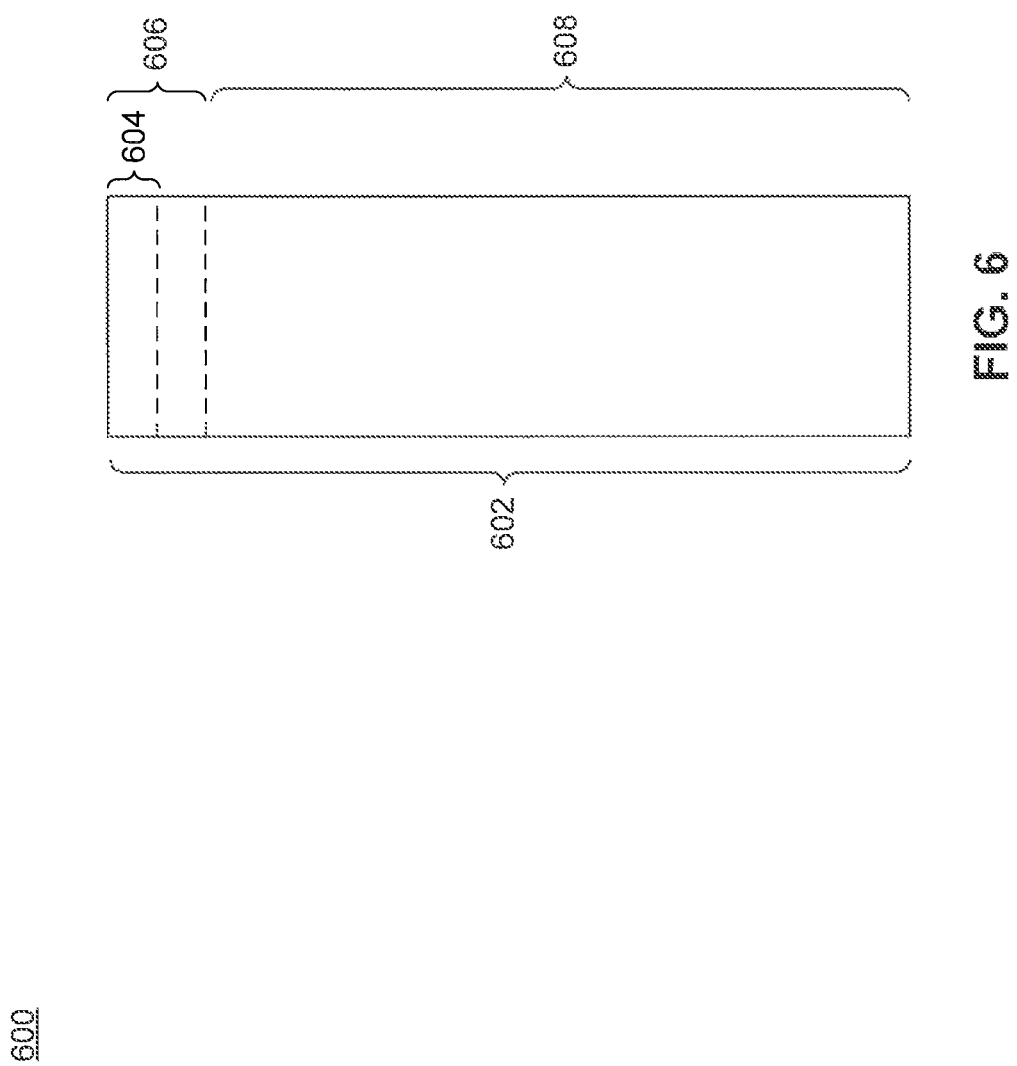
FIG. 6 illustrates a task memory of a compute unit, according to an embodiment.

FIG. 6 illustrates a local task memory 600 of a compute unit, according to an embodiment. Solely for illustrative purposes, local task memory 600 of FIG. 6 is described with reference to example embodiment of sets shown in the computing device 500 in FIG. 5. For example, local task memory 600 corresponds to compute unit 104_1 in FIG. 5. Portion 602, as shown in FIG. 6, is the entire portion of local memory 600. In one example, portion 600 may include a first shared portion 604, a second shared portion 606, and a private portion 608.

According to an embodiment, in order for the compute unit 104_1 to share tasks with another compute unit, the compute unit 104_1 may allow the other compute units to access tasks in shared portion 604 or 606 of its local memory 600. In other words, shared portion 604 of the entire portion 602 will become a shared memory among computing units in a first set, and shared portion 606 of the entire portion 602 will become a shared memory among computing units in a second set according to an embodiment. In an embodiment, only the same compute unit has access to private portion of its local memory. For example, only compute unit 104_1 has access to portion 608.

In an embodiment, only compute units in a level two set that includes the compute unit 104_1 have access to shared portion 604 of the local memory of the compute unit. In the embodiment, only compute units in a level one set that includes the compute unit 104_1 have access to shared portion 606. For example, referring to the embodiment shown in FIG. 5, shared portion 604 of local memory 600 of compute unit 104_1 can be accessed only by compute units in level-two set 522_1, namely 104_1, . . . , 104_5. Shared portion 606 of local memory 600 of compute unit 104_1 can be accessed only by compute units in level-one set 516_1, namely 104_1 and 104_2. Private portion 608 is accessible only by the compute unit 104_1 only, in the example embodiment.

Therefore, according to an embodiment, in order for the compute unit 104_1 to share tasks with another compute unit, the compute unit 104_1 may allow the other compute units in the same level-one set as compute unit 104_1, to access tasks in shared portion 606 of its local memory 600. In an embodiment, compute unit 104_1 may also allow other compute units in the same level-two set as compute unit 104_1, to access tasks in shared portion 604 of its local memory 600.

Scoped Task Sharing in Processor According to an Embodiment

Figure 7:
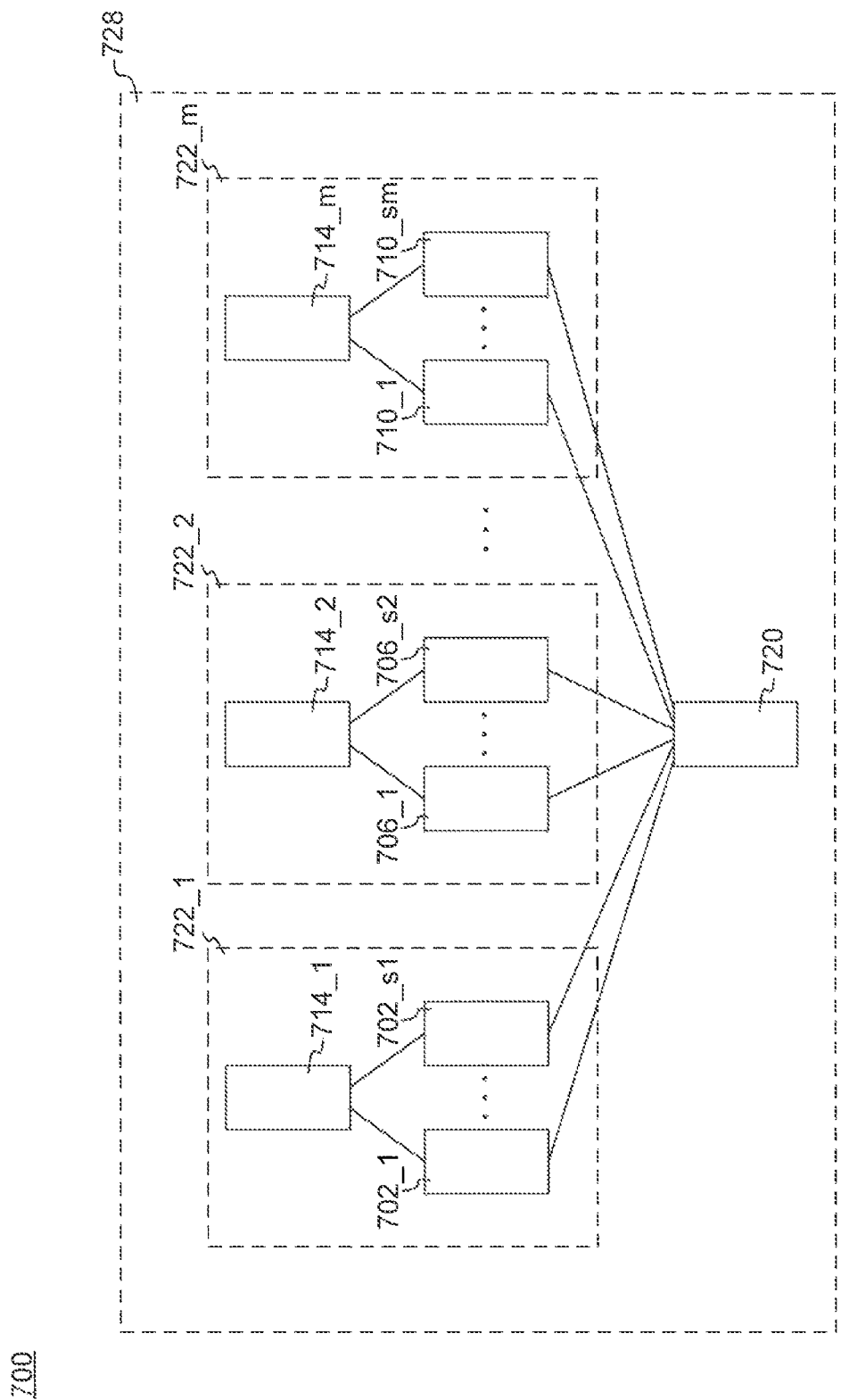
FIG. 7 illustrates task memories of a computing device, according to an embodiment.
Figure 8:
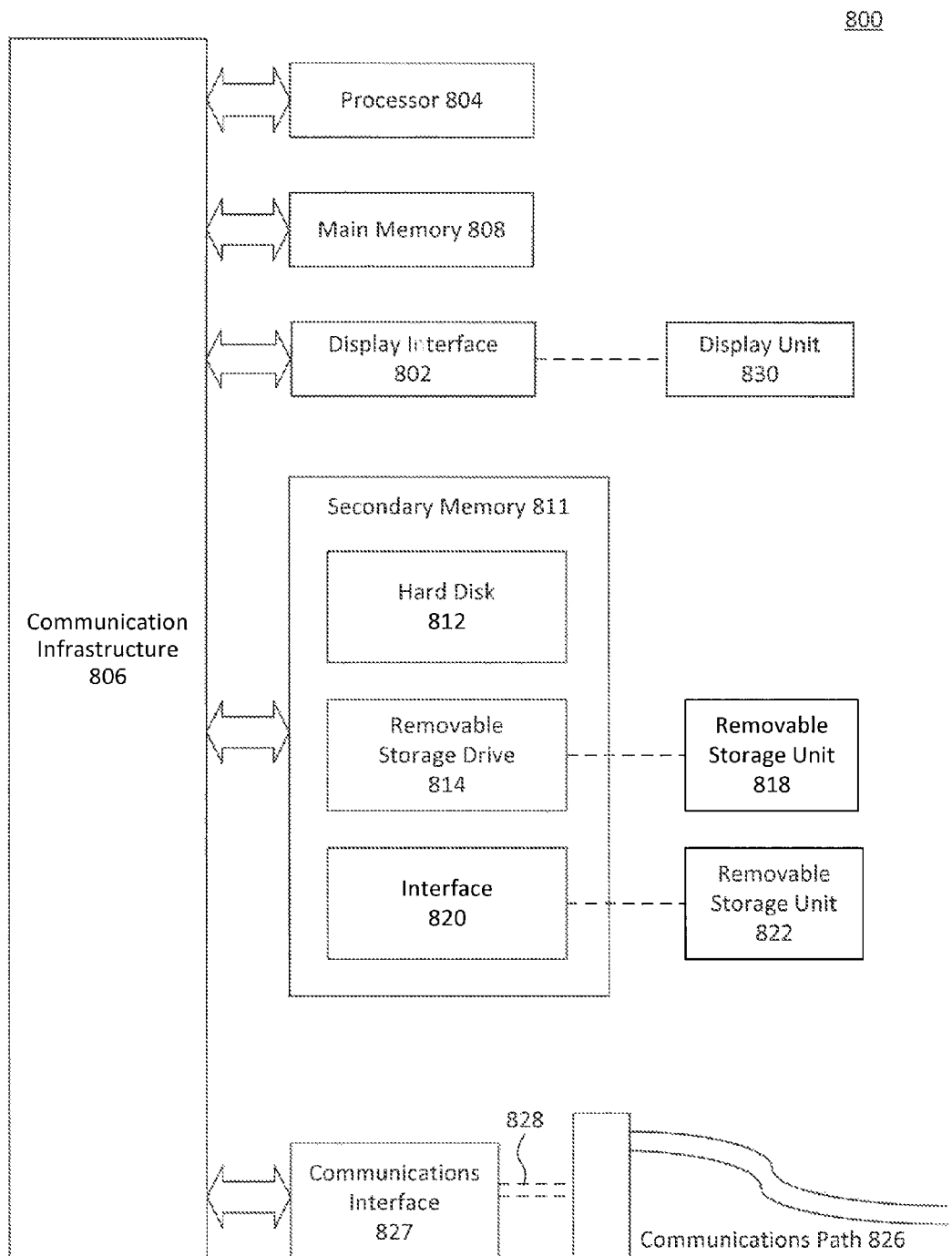
FIG. 8 illustrates a block diagram of an example computer system that can be used to implement aspects of the present disclosure.

FIG. 7 illustrates memories 700 in a level-two set of compute units, according to an embodiment. Set 728 is a level-two set of memories that correspond to sets of computing units in a level-two set of computing units, according to an embodiment. Sets 722_1, . . . , 722_m are level-one sets of memories, each corresponding to a level-one set of computing units. In an embodiment, level-two set 728 includes level-one sets 722_1 . . . 722_m.

Memories 702_1, . . . 702_s1 are private memories each corresponding to a computing unit in level-one set 722_1. Memories 706_1, . . . , 706_s2 are private memories each corresponding to a computing unit in level-one set 722_2. Memories 710_1, . . . , 710_sm are private memories each corresponding to a computing unit in level-one set 722_m. Memory 714_1 is a level-one shared memory in level-one set 722_1. Memory 714_2 is a level-one shared memory in level-one set 722_2. Memory 714_m is a level-one shared memory in level-one set 722_m. Memory 720 is a level-two shared memory in level-two set 728.

According to an embodiment, a compute unit in a level-one set of compute units donates a task from its private memory to the level-one shared memory in the level-one sot, if certain conditions are satisfied. The compute unit may donate a task to a level-two shared memory in the level-two set, if certain conditions are satisfied. Such donations allow task sharing among the compute units in the level-one and level-two sets, according to the embodiment.

In an embodiment creation of a new task triggers task sharing, if certain conditions are satisfied. In an embodiment, when a new task is created for a compute unit, if the number of tasks in the shared level-one memory of the level-one set that includes the compute unit is below a threshold, a task from the private memory of the compute unit will be donated to the level-one shared level-one memory of the set. In an embodiment, the donated task is the newly created task. This may allow a compute unit that has an empty task memory, to obtain a task from the shared memory instead of being idle. This may improve the efficiency of the computing device.

According to an embodiment, a shared memory of a level-one set donates a task to a level-two shared memory of a level-two set that includes the level-one shared memory. In an embodiment the donation of the task is triggered by creation of a new task in a compute unit in the level-one set. In an example embodiment, a level-one shared memory donates a task to a level-two shared memory when the number of tasks in the level-two shared memory is below a threshold. In another embodiment, the level-one shared memory donates task to the level-two shared memory, only when the number of tasks in the level-one shared memory is above another threshold. In an embodiment the donation of the task is triggered by creation of a new task in a compute unit in the level-one set.

In another embodiment, private memories of each compute unit donate tasks to a level-two shared memory. According to an embodiment, when a new task is created in a private memory of a compute unit, if the number of tasks in the level-two shared memory, in a level-two set that includes the compute unit, is below a threshold, the task is donated to the level-two shared memory. In another example, the task is donated to the level-two shared memory only when the number of tasks in a level-one shared memory, of the level one set that includes the compute unit, is above another threshold.

Referring to the example embodiment of FIG. 7, any time a new task is created in, for example, private task memories 702_1, . . . , 702_s1 in level-one set 722_1, if the number of tasks in the shared level-one set task memory 714_1 is below a threshold, the new task is donated to task memory 714_1.

In another example embodiment, if the number of tasks in the shared task memory 714_1 is above a first threshold, and the number of tasks in shared task memory 720 of level-two set 728, is below a second threshold, a new task that is created in private task memories 702_1, . . . , 702_s1 will be donated to level-two shared memory 720. Similar method may be applied to task donation in other compute unit sets 722_2, . . . , 722_m.

In another example, when the number of tasks in the level-two shared memory 720 is below a second threshold, a task from any of the level-one shared memories 714_1, . . . , 714_m may be donated to level-two shared memory 720. In an embodiment, the donation occurs from a level-one shared memory with a number of tasks above a second threshold.

The donation may happen when a new task is created in one of the level-one shared memories 714_1, . . . , 714_m, in an embodiment. For example, creating a new task in any of the level-one shared memories 714_1, . . . , 714_m may trigger donation of the task to level-two shared memory 720. The donation may occur when the number of tasks in level-two shared memory 720 is below a threshold.

In an embodiment, shared memories mentioned above are separate physical memories. In another embodiment, shared memories are portions of local memories as described with respect to FIG. 6. For example, portion 608 of local memory 600 may serve as the private memory for the compute unit corresponding to local memory 600. Portion 606 of all of the local memories in a level-one set, together may serve as the level-one shared memory for the level-one set. Portion 604 of all the local memories in a level-two set of local memories, together may serve as a level-two shared memory for the level-two set. Therefore all different embodiments mentioned above, with respect to FIG. 7, for sharing tasks by donating to the shared memories also applies to the memory sharing embodiment shown in FIG. 6.

The two-level hierarchy of compute unit sets described above are example embodiments. It is obvious to a person of ordinary skill in the art that the above systems and methods are not limited to two-level hierarchy and can be extended to multi-level hierarchies.

Computer system 800 includes one or more processors, such as processor 804. Processor 804 can be a special purpose or a general purpose processor. Examples of processor 804 are CPU, GPU, or a GPGPU, or APU as described earlier. Processor 804 is connected to a communication infrastructure 806 (for example, a bus or network) such as bus 340 of FIG. 3.

Computer system 800 also includes a main memory 808, such as random access memory (RAM) such as main memory 350 of FIG. 3, and may also include a secondary memory 810. Secondary memory 810 may include, for example, a hard disk drive 812, a removable storage drive 814, and/or a memory stick. Removable storage drive 814 may comprise a floppy disk drive, a magnetic tape drive, an optical disk drive, a flash memory, or the like. The removable storage drive 814 reads from and/or writes to a removable storage unit 818 in a well-known manner. Removable storage unit 818 may comprise a floppy disk, magnetic tape, optical disk, etc. that is read by and written to by removable storage drive 814. As will be appreciated by persons skilled in the relevant art(s), removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 that allow software and data to be transferred from the removable storage unit 822 to computer system 800.

Computer system 800 may also include a communications interface 824. Communications interface 824 allows software and data to be transferred between computer system 800 and external devices. Communications interface 824 may include a modem, a network interface (such as an Ethernet card), a communications port, a PCMCIA slot and card, or the like. Software and data transferred via communications interface 824 are in the form of signals that may be electronic, electromagnetic, optical, or other signals capable of being received by communications interface 824. These signals are provided to communications interface 824 via a communications path 826. Communications path 826 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 818, removable storage unit 822, and a hard disk installed in hard disk drive 812. Signals carried over communications path 826 can also embody the logic described herein. Computer program medium and computer usable medium can also refer to memories, such as main memory 808 and secondary memory 810, which can be memory semiconductors (e.g. DRAMs, etc.). These computer program products are means for providing software to computer system 800.

Computer programs (also called computer control logic) are stored in main memory 808 and/or secondary memory 810. Computer programs may also be received via communications interface 824. Such computer programs, when executed, enable computer system 800 to implement the embodiments as discussed herein. In particular, the computer programs, when executed, enable processor 804 to implement the disclosed processes, such as the steps in the methods of FIG. 4C-FIG. 7 as discussed above. Accordingly, such computer programs represent controllers of the computer system 800. Where the embodiments are implemented using software, the software may be stored in a computer program product and loaded into computer system 800 using removable storage drive 814, interface 820, hard disk drive 812 or communications interface 827. This can be accomplished, for example, through the use of general-programming languages (such as C or C++). The computer program code can be disposed in any known computer-readable medium including semiconductor, magnetic disk, or optical disk such as, CD-ROM, DVD-ROM). As such, the code can be transmitted over communication networks including the Internet and internets. It is understood that the functions accomplished and/or structure provided by the systems and techniques described above can be represented in a core (such as a processing-unit core) that is embodied in program code and may be transformed to hardware as part of the production of integrated circuits. This can be accomplished, for example, through the use of hardware-description languages (HDL) including Verilog HDL, VHDL, Altera HDL (AHDL) and so on, or other available programming and/or schematic-capture tools (such as, circuit-capture tools).

Embodiments are also directed to computer program products comprising software stored on any computer useable medium. Such software, when executed in one or more data processing device, causes a data processing device(s) to operate as described herein. Embodiments employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.). Embodiments may also be implemented as instructions stored on a non-transitory computer-readable medium, which may be read and executed by one or more processing units. Execution of these instructions by the one or more processing units would cause the processing unit(s) to perform any of the methods described in this specification. For example, execution of these instructions by the one or more processing units would cause the processing unit(s) to perform the methods illustrated, for example, in FIGS. 2C, 4C, 5 and 6.

It is to be appreciated that the Detailed Description section, and not the Abstract section, is intended to be used to interpret the claims. The Abstract section may set forth one or more but not all exemplary embodiments as contemplated by the inventor(s), and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A method implemented in a processor of a computing device, the method comprising:
   determining first and second sets of compute units of the processor;
   sharing a first set of tasks among the compute units within the first set of compute units; and
   sharing a second set of tasks among the compute units within the second set of compute units,
      wherein the sharing the first set of tasks comprises donating the first set of tasks from a private memory of a first compute unit in the first set of compute units to a shared memory of the first set of compute units; and
      wherein the sharing the second set of tasks comprises donating the second set of tasks from a private memory of a first compute unit in the second set of compute units to a shared memory of the second set of compute units.

2. The method of claim 1, wherein the sharing comprises:
   allowing a first compute unit in the first set of compute units to access the first set of tasks from a memory of a second compute unit in the first set of compute units; and
   allowing a first compute unit in the second set of compute units to access the second set of tasks from a memory of a second compute unit in the second set of compute units.

3. The method of claim 1, wherein the shared memory of the first set of compute units is accessible by all the compute units in the first set of compute units; and the shared memory of the second set of compute units is accessible by all the compute units in the second set of compute units.

4. The method of claim 3, further comprising
retrieving a task from the first set of tasks in the shared memory of the first set of compute units by a second compute unit in the first set of compute units when the second compute unit in the first set of compute units has an empty private memory; and
retrieving a task from the second set of tasks in the shared memory of the second set of compute units by a second compute unit in the second set of compute units when the second compute unit in the second set of compute units has an empty private memory.

5. The method of claim 1, wherein the first and second sets of compute units are mutually exclusive.

6. The method of claim 1, wherein the determining comprises using an architecture of the compute units of the processor, to determine the first and second sets of compute units.

7. The method of claim 1, wherein the determining comprises using connectivity among compute units in the processor to determine the first and second sets of compute units.

8. A method implemented in a processor of a computing device, the method comprising:
determining first and second level-one sets of compute units, each comprising at least one compute unit of the processor;
determining a level-two set of compute units that comprises a first compute unit of the first level-one set of compute units and a first compute unit of the second level-one set of compute units;
retrieving a first task from a level-one shared set of tasks when a private memory of the first compute unit is empty, wherein the level-one shared set of tasks is accessible by all compute units of the first level-one set of compute units; and
retrieving a second task, from a level-two shared set of tasks when the private memory of the first compute unit and the level-one shared set of tasks are empty, wherein the level-two shared set of tasks is accessible by all compute units of the level-two set of compute units.

9. The method of claim 8, further comprising:
allowing all the compute units of the first level-one set of compute units to access the first task in a private memory of a second compute unit of the first level-one set of compute units, thereby adding the first task to the level-one shared set of tasks.

10. The method of claim 9, wherein the allowing comprises:
allowing when a count of tasks in the level-one shared set of tasks is below a threshold.

11. The method of claim 8, further comprising
allowing all the compute units of the level-two set of compute units access to the second task in a private memory of a third compute unit in the level-two set of compute units, thereby adding the second task to the level-two shared set of tasks.

12. The method of claim 11, wherein the allowing further comprises
allowing when a count of tasks in the level-two shared set of tasks is below a threshold.

13. The method of claim 8, wherein the first level-one shared set of tasks comprises a level-one shared memory, and wherein the level-one shared memory is accessible by all the compute units of the level-one set of compute units.

14. The method of claim 13, further comprising:
donating a second task, from a private memory of second compute unit in the first level-one set of compute units to the level-one shared memory, when a count of tasks in the level-one shared memory is below a threshold.

15. The method of claim 8, wherein the level-two shared set of tasks comprises a level-two shared memory, wherein the level-two shared memory is accessible by all the compute units of the level-two set of compute units.

16. The method of claim 15, further comprising:
donating a second task, from a private memory of a second compute unit in the level-two set of compute units to the level-two shared memory, when a count of tasks in the level-two shared memory is below a threshold.

17. A system comprising:
a processor comprising a first set and a second set of compute units;
the processor configured to share a first set of tasks among the compute units within the first set of compute units, and share a second set of tasks among the compute units within the second set of compute units, and wherein
a first compute unit in the first set of compute units is configured to donate the first set of tasks from a private memory of the first compute unit in the first set of compute units to a shared memory of the first set of compute units; and
a first compute unit in the second set of compute units is configured to donate the second set of tasks from a private memory of the first compute unit in the second set of compute units to a shared memory of the second set of compute units.

18. The system of claim 17, further comprising:
a first compute unit in the first set of compute units wherein the first compute unit is configured to access the first set of tasks from a memory of a second compute unit in the first set of compute units; and
a first compute unit in the second set of compute units wherein the first compute unit is configured to access the second set of tasks from a memory of a second compute unit in the second set of compute units.

* * * * *